United States Patent
Halter et al.

(10) Patent No.: US 10,828,815 B2
(45) Date of Patent: Nov. 10, 2020

(54) INJECTION MOLDING MACHINE

(71) Applicant: Husky Injection Molding Systems Ltd., Bolton (CA)

(72) Inventors: Christophe Halter, Selange (BE); Sylvain Ludwig, Ottange (FR); Arnold Heinz Mai, Irrel (DE)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 473 days.

(21) Appl. No.: 15/524,648

(22) PCT Filed: Dec. 1, 2015

(86) PCT No.: PCT/CA2015/051246
§ 371 (c)(1),
(2) Date: May 5, 2017

(87) PCT Pub. No.: WO2016/095022
PCT Pub. Date: Jun. 23, 2016

(65) Prior Publication Data
US 2017/0368730 A1 Dec. 28, 2017

Related U.S. Application Data

(60) Provisional application No. 62/091,745, filed on Dec. 15, 2014.

(51) Int. Cl.
*B29C 45/24* (2006.01)
*B29C 48/694* (2019.01)

(52) U.S. Cl.
CPC .......... *B29C 45/24* (2013.01); *B29C 48/694* (2019.02); *B29C 2945/76856* (2013.01)

(58) Field of Classification Search
CPC .................. B29C 45/24; B29C 48/694; B29C 2945/76856
See application file for complete search history.

(56) References Cited

U.S. PATENT DOCUMENTS 5,246,660 A * 9/1993 Tsutsumi ................ B29C 45/52
264/328.17
6,196,820 B1 3/2001 Straka
(Continued)

FOREIGN PATENT DOCUMENTS

CN 1406735 A 4/2003
CN 102248647 A 11/2011
(Continued)

OTHER PUBLICATIONS

PCT International Search Report, Pengfei Zhang, dated Mar. 9, 2016, 3 pages.
European Search Report; dated Dec. 20, 2018; 7 pages.

*Primary Examiner* — Michael M. Robinson

(57) ABSTRACT

The invention pertains to an injection molding machine comprising, an injection nozzle (2) having a melt channel (6), an injection opening (5), and a filter (9) for filtering the molten resin within the injection nozzle (2). According to the invention, the melt filter (9) cooperates with the 5 melt channel (6) or a means (7) provided within the melt channel (6) in such a way, that during an injection phase of the injection molding machine, the molten resin is caused to pass through the filter (9), and during a decompression phase of the injection molding machine the molten resin is caused to bypass the filter (9).

20 Claims, 3 Drawing Sheets

(56) References Cited

U.S. PATENT DOCUMENTS

Figure 1:
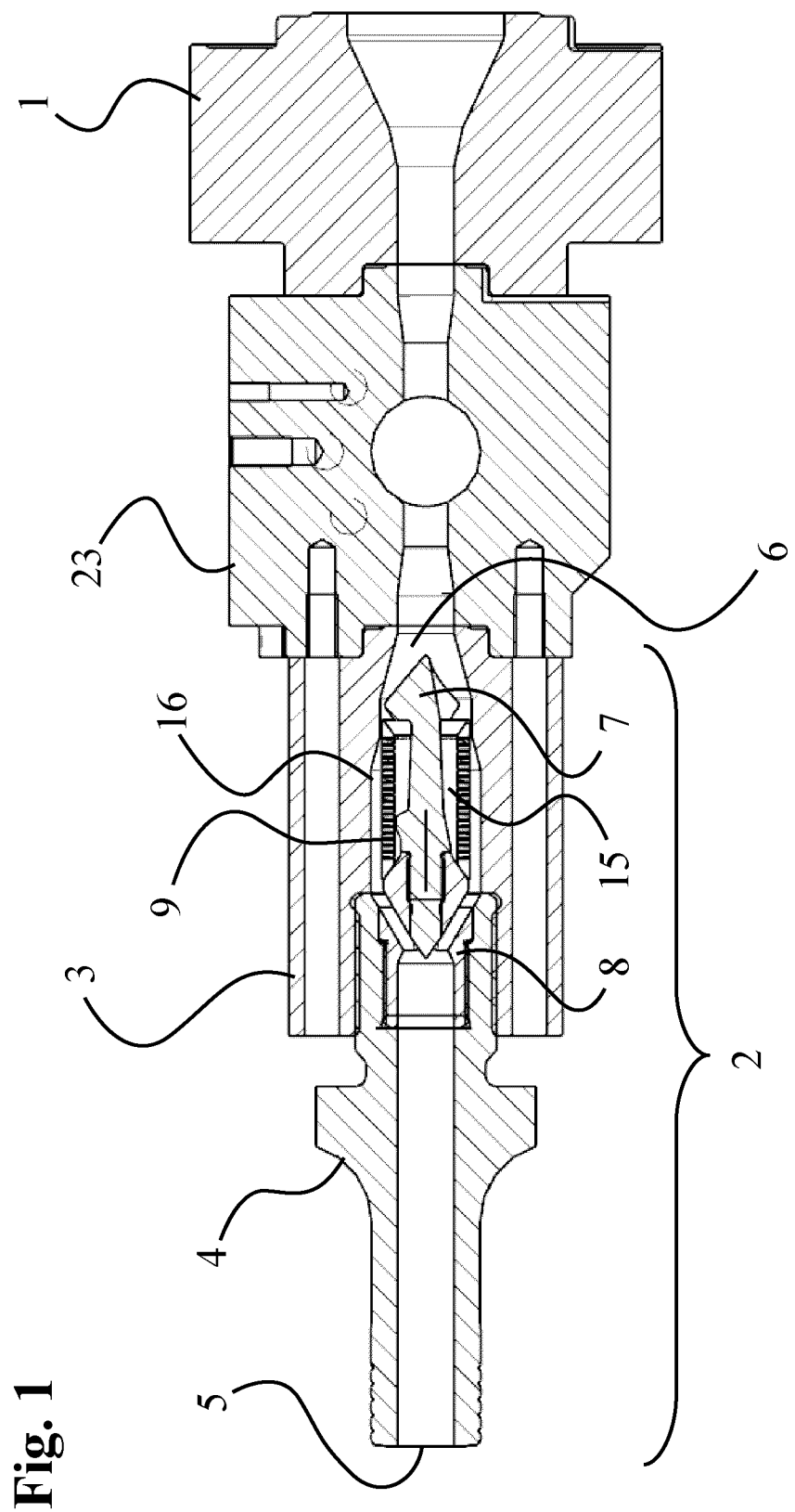

2003/0047506 A1    3/2003   Sueihara et al.
2005/0284601 A1   12/2005   Teng et al.
2012/0111426 A1    5/2012   Trakas

FOREIGN PATENT DOCUMENTS

| CN | 202114883 | U | 1/2012 | |
|----|-----------|---|--------|---|
| DE | 2524746 | A1 * | 12/1976 | ............. B29C 45/24 |
| DE | 10317635 | A1 | 11/2004 | |
| DE | 102005025035 | B3 | 10/2006 | |
| DE | 102007045439 | B3 | 10/2008 | |
| JP | 2003334841 | A | 11/2003 | |
| JP | 2001198961 | A | 7/2004 | |

* cited by examiner

INJECTION MOLDING MACHINE

TECHNICAL FIELD

The present invention relates to an injection molding machine, and more particularly to an injection molding machine having the features as set forth in the preamble of claim 1.

BACKGROUND

In the injection molding of thermoplastic resin it is common practice that for avoiding leakage of resin at the interface between the injection nozzle and the sprue bushing during the filling phase and the holding pressure phase, the tip of the injection nozzle is pressed against the sprue bushing of the injection mold with great force, usually by means of a hydraulically driven press-on assembly. For the subsequent cooling phase, by way of a take-off stroke of the press-on assembly, the injection nozzle and the sprue bushing are separated. To this end, it is necessary to decompress the molten resin which is present in the injection nozzle. When using a hot runner system, the molten resin in the hot runner has to be decompressed as well in order to obtain sprueless injection molded products. A relief volume for the decompression of the molten resin may be merely created by separating the nozzle from the sprue bushing. In a more efficient way the relief volume may be created by pulling the extruder screw of the plasticizing unit backwards.

In order to remove solid particles from the molten resin prior to injection, it is known to use a filter arranged between the plasticizing unit and the injection nozzle. U.S. Pat. No. 6,168,411 (Inventor: WILDMAN; Published: 2 Jan. 2001) discloses a filter arranged within the extruder barrel, for removing solid particles from the molten resin prior to the injection thereof. For various reasons this known filter is not satisfactory. The object underlying the present invention is to provide an improved filter means for filtering the molten resin prior to injection.

SUMMARY

The present invention providing an injection molding machine having the features defined by claim 1. By providing a filter means that interacts with a melt channel or a means arranged within the melt channel such that the molten resin during an injection phase of the injection molding machine is caused to pass through the filter, and during the decompression phase of the injection molding machine is caused to bypass the filter, the filter means according to the present invention do not form an obstruction of the melt flow. Thus, the period for decompression becomes shorter, thereby reducing the overall cycle time.

Further details and advantages associated with the present invention will be appreciated from the dependent claims.

The effective filter surface should be as large as possible so that there is only little resistance the molten resin has to overcome during the injection phase. Providing a large effective filter surface, the time for injection can be reduced, and thus the entire cycle time. In order to provide an effective filter surface that is larger than the cross-section of the melt channel, the filter according to the present invention has an annular configuration and is arranged in-between two annular filter supports. In this way the annular filter divides the melt channel into a cylindrical section within the filter, and an annular section outside the filter. Thus, the effective filter surface depends on the longitudinal axis of the filter and not on the cross-section of the melt channel.

A means for guiding the molten resin are provided within the melt channel. The means for guiding the molten resin are such configured that they stop the flow of molten resin through the middle of the melt channel and redirect the molten resin to the outer section of the melt channel.

The means for guiding the molten resin and the filter are displaceable relative to each other. By displacing the means for guiding the molten resin and the filter relative to each other, particular passages for the molten resin are closed, while other passages are opened. It is of advantage that the above displacement is initiated by the molten resin itself, thereby providing that the position the means for guiding the molten resin and the filter have relative to each other, depends on the direction of the flow of the molten resin. Thus, an actuator for displacing the means for guiding the molten resin and the filter relative to each other, is not required.

The relative displacement of the means for guiding the molten resin and the filter should be defined precisely in order to obtain reproducible results. Therefore, at an end facing the inlet port for the melt and at an end facing the injection opening, the means for guiding the molten resin and the filter each are provided with stops, wherein a respective stop of the stops of the means for guiding the molten resin interacts with a corresponding stop of the stops of the filter. Thus, the relative movement of the filter and the means for guiding the molten resin is confined in both directions, and the length of the displacement path is precisely defined.

Preferably, the means for guiding the molten resin are such configured that at one end thereof at least one passageway for the molten resin is provided by means of which the melt channel either upstream or downstream of the means for guiding the molten resin, is in communication with the cylindrical section within the filter. The at least one passageway is completely independent from the relative position of the filter and the means for guiding the molten resin, thereby providing that the molten resin which is in the cylindrical section within the filter, always has an outlet to the melt channel or an inlet off the melt channel, depending on the flow direction of the molten resin. If the passageway is provided downstream of the means for guiding the molten resin, to during injection, the molten resin is pressed through the filter from the annular section outside the filter to the cylindrical section within the filter. If the passageway is provided upstream of the means for guiding the molten resin, the molten resin flows through the filter in the opposite direction from the cylindrical section within the filter to the annular section outside the filter.

In principle, either the filter or the means for guiding the molten resin must be fixed within the melt channel, while the respective other member is slidably supported. Thus, the filter may be fixedly mounted, while the means for guiding the molten resin may be slidably mounted. It is, however, particularly preferred that the filter is displaceable and displaced by the flow of the molten resin. By way of such an arrangement, in particular the cleaning of the filter is simplified.

Preferably, the filter can be displaced into an injection position in which the stops of both the filter and the means for guiding the molten resin face the injection opening and cooperate in such a way that the side of the cylindrical section within the filter is closed. Since during the injection phase molten resin is continuously delivered through the inlet port for the melt having the effect that the pressure in the cylindrical portion within the filter increases, the molten resin accumulated in the cylindrical section ingresses via the filter into the annular section outside the filter. Thus, during the injection phase the molten resin is caused to pass through the filter and contaminants are removed therefrom.

The annular section outside the filter communicates with the injection opening. To this end a plurality of individual channels arranged along the longitudinal axis of the melt channel and converging at the injection opening, may be provided. Alternatively, a tapering funnel-shaped portion may be provided, which is arranged annularly with respect to the longitudinal axis of the melt channel and in-between the annular section outside the filter and the melt channel.

During the decompression phase, the flow of the molten resin moves towards the inlet portal for the melt and is withdrawn from the injection opening, while the filter is been moved into a decompression position. In that position of the filter, the stops thereof and the stops of the means for guiding the molten resin facing the injection opening, are spaced from each other and form a passage for the molten resin between the annular section outside the filter and the cylindrical section within the filter. The movement of the filter is confined by the stops of the filter and those of the means for guiding the molten resin which face the inlet port for the melt. By way of such a decompression position of the filter, a passage for the molten resin is formed, such that via said passage the molten resin from the annular section outside the filter can enter the to cylindrical section within in the filter without passing through the filter. Thus, the molten resin needs not to overcome the resistance of the filter, and therefore the decompression phase can be completed more quickly.

Preferably, the injection nozzle has a detachable nozzle tip. Thus, the injection opening is located in the detachable nozzle tip, thereby facilitating maintenance work and cleaning. The nozzle tip may be provided with an external screw thread which screws into an internal screw thread of the injection nozzle.

In order to facilitate cleaning of the filter, the means for guiding the molten resin and the filter can be removed from the injection nozzle when the nozzle tip is disassembled. Cleaning of the filter and maintenance work on the nozzle tip therefore can be carried out together without great efforts.

Most preferably, the means for guiding the molten resin and the filter are mounted to the nozzle tip. Thus, the filter and the means for guiding the molten resin are automatically removed together with the nozzle tip when disassembling the nozzle tip, while the correlation between the means for guiding the molten resin and the nozzle tip is maintained. Mounting the means for guiding the molten resin and the filter to the nozzle tip also facilitates intermediate cleaning of the filter, since the filter is readily accessible after the disassembly of the nozzle tip. After cleaning, the nozzle tip having the means for guiding the molten resin attached thereto and the filter displaceable arranged thereon, in a simple manner may be screwed into the injection nozzle.

DETAILED DESCRIPTION OF THE DRAWINGS

Figure 2:
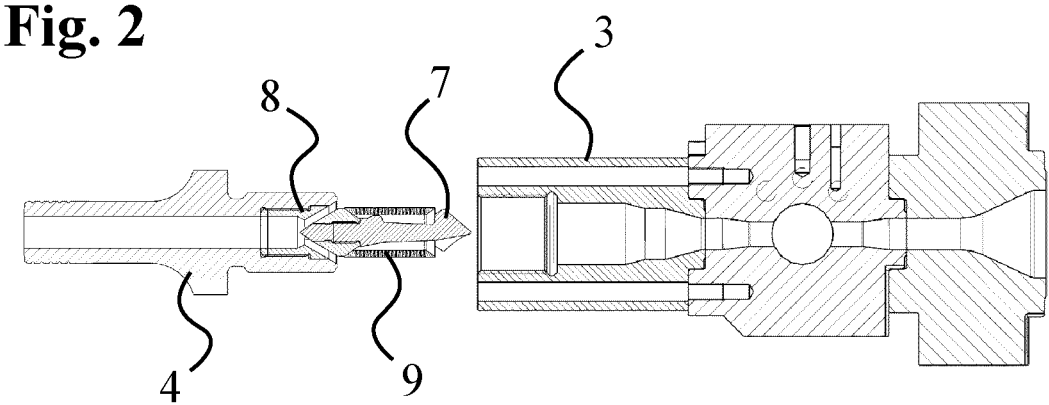
Figure 3:
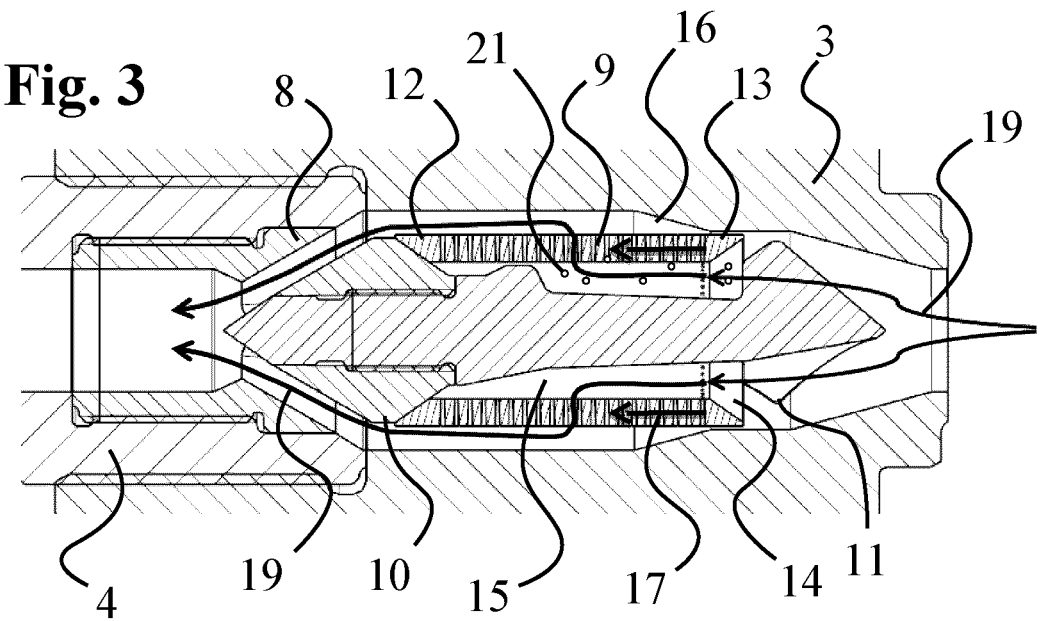
Figure 4:
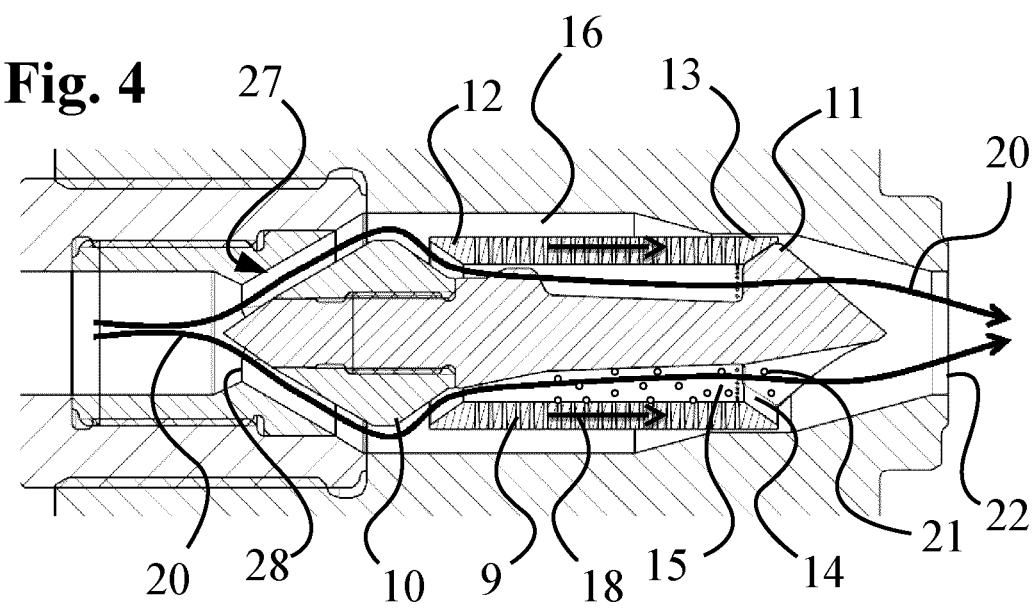
Figure 5:
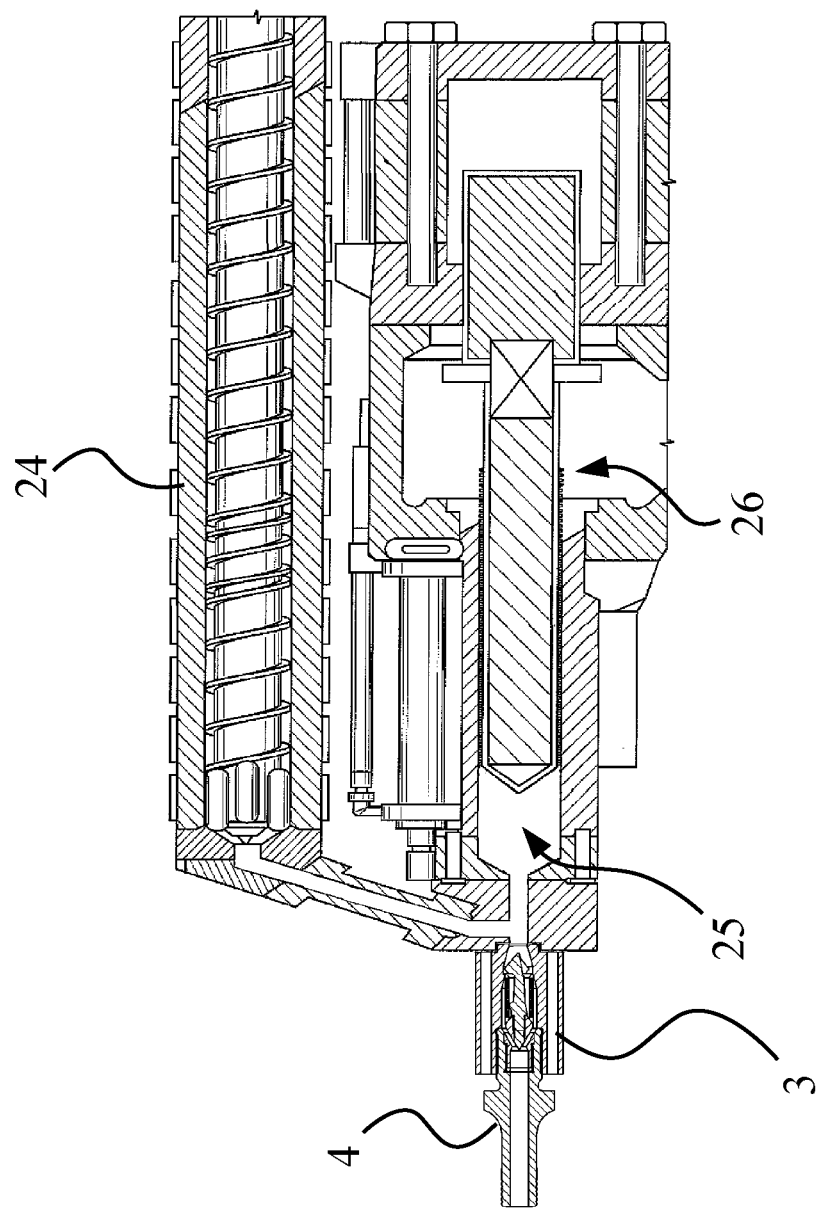

Further details and advantages of the present invention will be more fully appreciated by reference to the following detailed description of an embodiment in conjunction with the accompanying drawings, in which:

FIG. 1: depicts a cross-sectional view of an injection nozzle according to the present invention, in a first embodiment, while an extruder unit is merely adumbrated, FIG. 2: depicts the injection nozzle of FIG. 1 having the nozzle tip disassembled, FIG. 3: depicts the flow of molten resin in the injection nozzle during the injection phase, FIG. 4: depicts the flow of molten resin in the injection nozzle during the decompression phase and FIG. 5: depicts a cross sectional view of a second embodiment of the invention with an injection nozzle connected to a shooting pot of a shooting pot assembly of the injection molding machine.

FIG. 1 depicts a portion of an injection molding machine according to the present invention. Head 1 of the extruder barrel provides for the connection between the plasticizing unit and injection nozzle 2. Between the head 1 of the extruder barrel and the injection nozzle 2 a shut-off valve 23 may be arranged which however is not necessary for all embodiments of the present invention The plasticizing unit which, as it will be appreciated by those skilled in the art, usually comprises an extruder barrel and an extruder screw for plasticizing plastic granulate, hereinbelow will not be described in more detail.

Injection nozzle 2 comprises a nozzle body 3 and a detachable nozzle tip 4. Furthermore, injection nozzle 2 defines a melt channel 6 which extends through nozzle body 3 and nozzle tip 4. From an inlet port 22 (see FIG. 4) via melt channel 6 molten resin is delivered under pressure to injection opening 5.

Means 7 for guiding the molten resin (in the following denoted as melt guide 7) are provided in melt channel 6 extending through nozzle body 3. The melt guide 7 is attached to a support 8 which is detachably connected to nozzle tip 4. In the area of nozzle body 3, melt channel 6 accommodates an annular filter 9 having openings. The openings of filter 9 are such configured that molten resin may pass through the filter from the inside to the outside and to trap contaminants entrained therein.

On both of it ends filter 9 has a stop 12 and 13, respectively (shown in FIG. 3). The stops are configured to provide filter supports, wherein filter 9 as a real filter spans between said stops. Thus effective filtering is provided by way of filter 9 and not by way of said stops which are impermeable for molten resin.

As shown in FIG. 3, corresponding to stops 12 and 13, stops 10 and 11, respectively, are provided on both ends of the melt guide 7. Filter 9 is displaceable and with its stops 12 and 13, it can be displaced between stops 10 and 11 of the means 7 for guiding the molten material.

FIG. 2 depicts injection nozzle 2 and disassembled nozzle tip 4. Nozzle tip 4 may be mounted to nozzle body 3 by means of a screw thread or in another way. When decoupling nozzle tip 4 from nozzle body 3, nozzle tip 4 together with the thereto connected melt guide 7 and filter 9 slidably supported by the melt guide 7, may be withdrawn from nozzle body 3. Further, the support 8 may be connected to nozzle tip 4 by means of a screw thread. In this way, the melt guide 7 together with filter 9 and support 8 may be withdrawn from nozzle tip 4, thereby providing an easy way for cleaning both filter 9 and melt channel 6, be it within nozzle tip 4 or within nozzle body 3.

Under reference to FIGS. 3 and 4, hereinbelow the operation of the device of the present invention will be described in more detail. FIGS. 3 and 4 depict only that portion of nozzle body 3 and nozzle tip 4 which accommodates the melt guide 7 and the filter 9.

FIG. 3 depicts a portion of the injection nozzle 2 during the injection phase, i.e. that phase of an injection cycle where plasticized plastic material, i.e. molten resin, is delivered from the extruder barrel under pressure towards the injection opening 5 (FIG. 1). The flow of molten resin causes filter 9 to move in the direction of arrow 17 which thus indicates the moving direction of filter 9 at the beginning of the injection phase. Movement of filter 9 however is limited to a short distance. Having been moved along that distance, stop 12 of filter 9 facing towards injection opening 5 abuts against stop 10 of the guide means 7 for guiding the molten material which similarly faces towards injection opening 5. In this way, movement of filter 9 is stopped.

Since stops 10 and 12 are firmly pressed against each other, thereby excluding that a passage for molten resin can be formed, cylindrical section 15 within filter 9 is positioned in such a way that there is only one entrance left for the molten resin for entering passage 14 provided by the melt guide 7. Thus, the molten resin may leave the cylindrical section 15 within filter 9 only via filter 9 itself. Consequently, the molten resin, via the openings of filter 9, is pushed from the cylindrical section 15 within filter 9 into the annular section 16 outside filter 9.

During its passage through filter 9, contaminants contained in the molten resin are either removed by filter 9 and adhere to the same, or the concentration of contaminants contained in the molten resin increases in the cylindrical section 15 within filter 9. In either case, it is ensured that contaminants cannot get through filter 9 and thus cannot be released towards the mold.

During the injection phase, the molten resin moves along arrow 19 (as shown in FIG. 3). Thus, arrow 19 indicates the path of the molten resin during the injection phase from the portion of the melt channel 6 located on the side of the melt guide 7 which faces the extruder cylinder, to the portion of melt channel 6 located on the side of the melt guide 7 which faces injection opening 5. Annular section 16 outside filter 9 is connected to melt channel 6 on the side of the melt guide 7 which faces injection opening 5 (FIG. 1), either via a multiple of individual guide channels or via a funnel-shaped guide which is intercepted by radially arranged ribs, and which connects the means 7 for guiding the molten resin to support 8.

Thus, contaminants are removed from the molten resin arriving at injection opening 5 and therefore, injection molded articles are free of contaminants as well.

Following the injection phase, the injection nozzle usually is withdrawn from the mold.

FIG. 4 illustrates the device of the present invention during the decompression phase. As this process is well-known to those skilled in the art, it will not be further elaborated on how decompression is performed. In either case molten resin is withdrawn from the injection opening in a direction towards the extruder barrel.

Similar to the injection phase, also in the decompression phase the flow of molten resin causes filter 9 to move along with the molten resin, wherein in this case filter 9 moves in the direction of arrow 18 which thus indicates the moving direction of filter 9 at the beginning of the decompression phase. Movement of filter 9, again, is limited to a short distance, wherein at the end thereof stop 13 of filter 9 abuts against stop 11 of the melt guide 7 facing the extruder barrel.

Due to the displacement of filter 9, a gap is formed in-between stops 10 and 12, which gap allows the molten resin to flow from annular section 16 outside filter 9 into cylindrical section 15 within filter 9. As the gap offers less resistance to the molten resin than filter 9, the molten resin does not flow through the openings of filter 9, but rather through the gap between stops 10 and 12. The molten resin may leave the cylindrical section 15 within filter 9 via passage 14 of the melt guide 7.

Arrows 20 indicate the path the molten resin takes during the decompression phase along melt channel 6, i.e. the portion thereof which spans from the side of the melt guide 7 facing injection opening 5 (FIG. 1) to the side of the melt guide 7 facing the extruder barrel. In this way, molten resin on the side of the melt guide 7 facing the extruder barrel, is guided by melt channel 6 either by way of a plurality of individual guide channels or by means of a funnel-shaped guide which is intercepted by radially arranged ribs and which connects the melt guide 7 to support 8. Thus, during the decompression phase the molten resin is caused to bypass filter 9 without passing through the openings of filter 9, thereby increasing the decompression velocity and decreasing the decompression period. This reduces the entire cycle time and thus the manufacturing costs for the injection molded articles.

During the decompression phase the molten resin therefore enters the cylindrical section 15 within filter 9 via the gap provided by stops 10 and 12. Having entered the cylindrical section 15 within filter 9, the molten resin is guided along the inner surface of filter 9 until it reaches passage 14 of the melt guide 7. In this way, contaminants 21 which have been concentrated in molten resin in the cylindrical section 15 within filter 9 are pulled back together with the molten resin. Contaminants superficially adhering to filter 9 are picked up as well and are discharged. Only contaminants which have entered filter 9 more deeply are not removed.

If, after a reasonable period of time, filter 9 becomes clogged or if the resistance offered by filter 9 against the flow of molten resin becomes too great, filter 9 must be cleaned. In order to clean filter 9 it is only necessary to detach nozzle tip 4 from nozzle body 3. Detaching nozzle tip 4 from nozzle body 3 allows that the melt guide 7 together with filter 9 connected to nozzle tip 4 may be withdrawn from melt channel 6 extending through nozzle body 3. Hereinafter, filter 9 which is now freely accessible can be cleaned in an easy way and released from any filtered contaminants.

FIG. 5 shows another embodiment of the invention. The nozzle body 3 is connected directly to the plastification unit 26 of an injection molding machine. This plastification unit 26 uses an extruder barrel 24 for plasticizing the resin. The required volume of molten resin is supplied to the shooting pot 25 and then is pressed through nozzle 2 into the mold (not shown). The operation of the filter in this embodiment is the same as in the first embodiment illustrated in FIGS. 1 to 4 and therefore will not be explained any further.

What is claimed is:
1. An injection molding machine comprising:
   an injection nozzle having a melt channel,
   an injection opening, an inlet port for a molten resin and
   a filter for filtering the molten resin within the injection nozzle, wherein
   the filter is configured to cooperate with the melt channel for molten resin or a means arranged within the melt channel, such that during an injection phase of the injection molding machine, the molten resin is caused to flow through the filter and during a decompression phase of the injection molding machine, the molten material is caused to bypass the filter
   wherein the filter is of an annular design and arranged, such that it divides the melt channel into a cylindrical section within the filter and an annular section outside the filter, the annular section outside the filter commu- nicates with the injection opening and the filter is displaceable into a decompression position in which the stops of the filter and of the means for guiding the molten resin which face the injection opening are spaced from each other and provide a passage for the molten resin from the annular section outside the filter into the cylindrical section within the filter.

2. The injection molding machine of claim 1, wherein the means for guiding the molten resin is provided within the melt channel, wherein the means for guiding the molten resin and the filter are displaceable relative to each other.

3. The injection molding machine of claim 2 wherein the injection nozzle has a detachable nozzle tip.

4. The injection molding machine of claim 3 wherein the means for guiding the molten resin and the filter can be withdrawn from the injection nozzle upon detachment of the nozzle tip.

5. The injection molding machine of claim 2, wherein both the means for guiding the molten resin and the filter at respective ends thereof facing the inlet port and facing the injection opening each have a stop, wherein a respective stop of the means for guiding the molten resin cooperates with a corresponding stop of the filter.

6. The injection molding machine of claim 1, wherein the means for guiding the molten resin are configured such that at one end thereof at least one passage is provided, such that the melt channel via the at least one passage communicates with the cylindrical section within the filter, either downstream or upstream of the means for guiding the molten resin.

7. The injection molding machine of claim 1, wherein the filter is displaceable and is displaced by the flow of the molten resin.

8. The injection molding machine of claim 7 wherein the injection nozzle has a detachable nozzle tip.

9. The injection molding machine of claim 8 wherein the means for guiding the molten resin and the filter can be withdrawn from the injection nozzle upon detachment of the nozzle tip.

10. The injection molding machine of claim 7, wherein the filter is displaceable into an injection position in which the stops of the filter and of the means for guiding the molten resin which face the injection opening cooperate with each other such that the side of the cylindrical section within the filter facing the injection opening is closed.

11. The injection molding machine of claim 1, wherein the injection nozzle has a detachable nozzle tip.

12. The injection molding machine of claim 11, wherein the means for guiding the molten resin and the filter can be withdrawn from the injection nozzle upon detachment of the nozzle tip.

13. The injection molding machine of claim 12, wherein the means for guiding the molten resin and the filter are mounted to the nozzle tip.

14. The injection molding machine of claim 2 wherein the means for guiding the molten resin are such configured that at one end thereof at least one passage is provided, such that the melt channel via the at least one passage communicates with the cylindrical section within the filter, either downstream or upstream of the means for guiding the molten resin.

15. The injection molding machine of claim 5 wherein the means for guiding the molten resin are such configured that at one end thereof at least one passage is provided, such that the melt channel via the at least one passage communicates with the cylindrical section within the filter, either downstream or upstream of the means for guiding the molten resin.

16. The injection molding machine of claim 5 wherein the filter is displaceable and is displaced by the flow of the molten resin.

17. The injection molding machine of claim 6, wherein the filter is displaceable and is displaced by the flow of the molten resin.

18. The injection molding machine of claim 16 wherein the filter is displaceable into an injection position in which the stops of the filter and of the means for guiding the molten resin which face the injection opening cooperate with each other such, that the side of the cylindrical section within the filter facing the injection opening is closed.

19. The injection molding machine of any of claims 1, 2 to 10, 11 to 13, and 9 to 14, further comprising an extruder barrel having an extruder screw for plasticizing granular plastic material to molten resin delivered towards the injection nozzle of the injection molding machine.

20. The injection molding machine of any of claims 1, 2 to 10, 11 to 13, and 9 to 14, further comprising a shooting pot assembly receiving molten resin from an extruder barrel and delivering the molten resin towards the injection nozzle of the injection molding machine.

* * * * *